United States Patent [19]

Heinrichs, Jr.

[11] 4,326,097

[45] Apr. 20, 1982

[54] ELECTRICAL DEVICE WITH INSULATING CONDUCTOR SUPPORT STRUCTURE

[75] Inventor: Frank W. Heinrichs, Jr., McMurray, Pa.

[73] Assignee: McGraw-Edison Company, Rolling Meadows, Ill.

[21] Appl. No.: 117,202

[22] Filed: Jan. 31, 1980

[51] Int. Cl.³ .................... H01B 17/58; H02G 3/04; H01F 15/10

[52] U.S. Cl. .................... 174/155; 138/157; 174/152 G; 248/56; 336/192

[58] Field of Search ............ 174/65 G, 152 G, 153 G, 174/155, 156, 167; 16/2; 248/56; 336/5, 10, 12, 192; 138/157, 158, 161; 310/215

[56] References Cited

U.S. PATENT DOCUMENTS

| | | | |
|---|---|---|---|
| 230,290 | 7/1880 | Lilly | 174/155 |
| 751,743 | 2/1904 | Mahoney | 174/156 |
| 2,006,931 | 7/1935 | Powers | 174/155 |
| 2,252,440 | 8/1941 | Safford | 310/215 X |
| 2,408,253 | 9/1946 | Diebold | 174/155 X |
| 2,820,953 | 1/1958 | Cuthbertson | 336/150 X |
| 2,934,726 | 4/1960 | Barengoltz | 336/192 |
| 2,935,859 | 5/1960 | Marvin, Jr. | 310/215 X |

FOREIGN PATENT DOCUMENTS 1221728  1/1960  France ............ 174/153 G

*Primary Examiner*—Laramie E. Askin
*Attorney, Agent, or Firm*—Jon Carl Gealow; James A. Gabala

[57] ABSTRACT

A conductor support is provided for use with high voltage electrical devices having mounting walls with apertures formed therein through which electrical conductors pass. The conductor support is formed of first and second channel members sequentially inserted in the mounting wall aperture. The first channel member includes walls bendable toward and away from each other, corresponding to collapsed and expanded configurations of the first channel member, respectively. The first channel member is collapsed to take on a reduced cross sectional area, and is inserted through the aperture of the mounting wall. The first channel member includes retaining members, such as notches or grooves, for engaging the mounting wall. After insertion, the first channel member is expanded to bring the retaining members into engagement with the mounting wall. The second channel member is then telescopically inserted within the first channel member, forming an interference fit therewith, while maintaining the engagement between the first channel member and the mounting wall. The channel members may be variously embodied, having generally U-shaped, triangular, and circular cross-sectional configurations.

15 Claims, 11 Drawing Figures

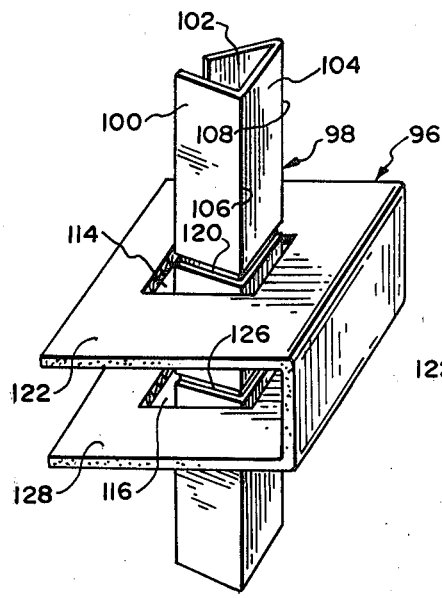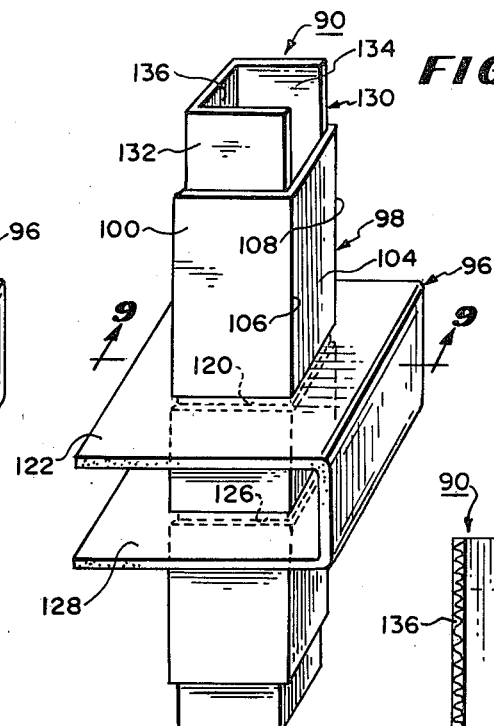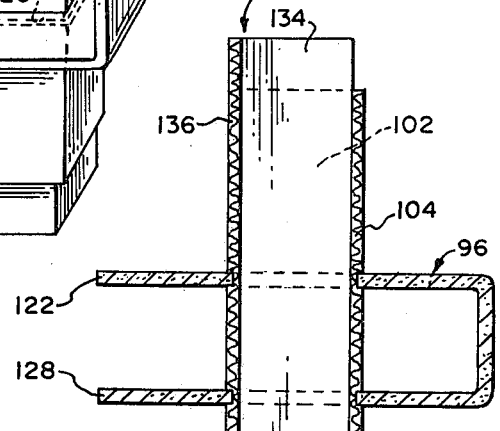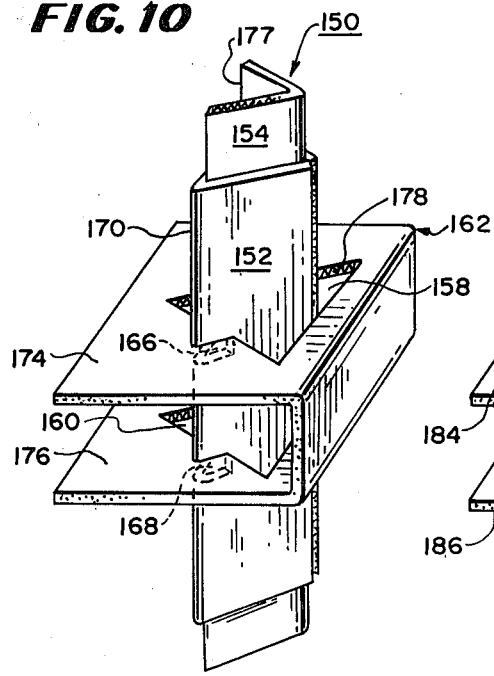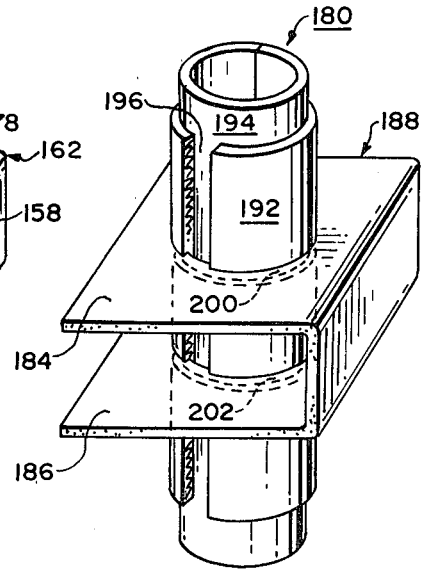

ELECTRICAL DEVICE WITH INSULATING CONDUCTOR SUPPORT STRUCTURE

BACKGROUND OF THE INVENTION

This invention pertains to high voltage electrical devices, and in particular to insulating conductor supports for internal high voltage leads which pass through apertures in internal braces and the like frame-work members located within those devices. This invention finds particular application with respect to insulating conductor supports for high-voltage conductors which interconnect the coils of multi-phase power class transformers. Such conductors are relatively heavy, and require support so as to be held in a fixed location, thereby eliminating shifting of the conductors which may cause the insulation on such conductors to wear away in time, resulting in an unintentional grounding of those conductors. Conductors of the aforementioned type used in multi-phase transformers span generally vertical and horizontal distances, receiving support from wood or fiber braces which form part of an internal framework of the transformer. At points where the conductors pass through apertures formed in the braces, an insulating fiber collar enclosing the conductors is provided to enhance the dielectric strength of the insulation system extending between the conductors, the brace, and grounded portions of the transformer. These collars are typically secured to the brace by an adhesive, by a clamping arrangement, such as a split clamp, or by other fastening devices of inferior dielectric strength compared to the remaining insulation system. Such adhesives or clamping arrangements, when combined with the brace, impair the dielectric strength of that brace, thereby reducing the electrical insulation between the high voltage conductor and adjacent grounded portions of the device's internal framework.

In the past, manufacturers of large electrical devices were able to rely on large oil-filled spaces between high voltage conductors and grounded internal brace members. But now it is desirable to reduce the overall size of such equipment, thereby reducing the large oil-filled spaces, bringing high voltage conductors and grounded parts closer together, thereby increasing the electric field stresses to which the insulating parts are subjected during factory testing and operation. Consequently, energized parts must be insulated by members having a dielectric strength greater than that heretofor required. Also, the operating and testing voltages of such equipment are being increased, and high voltage electrical testing standards impose protracted over-voltages on such equipment, which further increases the stress which the internal insulating systems of such devices are called upon to withstand. Any corona discharge, and/or electrical tracking, caused by excessive electrical stresses within such devices must be avoided, since localized carbonization and gas formation due to decomposition of organic materials exposed to the discharges will be experienced. Carbon particles or gasses resulting from such localized discharges will become suspended in the dielectric fluids within which such devices are immersed and which are circulated throughout an electrical device to provide cooling to the internal portions thereof. Such carbon particles or gasses suspended in such circulated fluids may present a heightened possibility of dielectric failure throughout the electrical device, thereby reducing the reliability of the electrical device, and possibly the integrity of the power system within which the device is installed.

The presence of adhesives, metallic clamping arrangements or the like inferior dielectric apparatus located immediately adjacent high voltage conductors which pass through portions of internal framework, present a substantial risk that corona discharge will occur either during testing of the device, or during its subsequent operation. Such risk of corona discharge and possible insulation failure must be avoided since large electrical devices require a substantial capital investment and also, due to their physical size and complex electrical connection, are not readily replaceable. Further, these devices are expected to remain in continuous service over 30 or more years of operation. Should excessive internal electrical discharge or insulation failure occur, the devices must be taken out of service, which usually inconveniences the consumers who are supplied electrical energy through the electrical devices.

An economic manufacture of such electrical devices requires that the insulating supports of internal electrical conductors be easily installed to surround one or more previously installed conductors without adhesives, or clamping arrangements.

SUMMARY OF THE INVENTION

Accordingly, it is a primary object of the present invention to provide a novel and improved conductor support capable of being installed in an electrical device without adhesives, clamping arrangements, or the like.

It is another object of the present invention to provide a novel and improved conductor support which can be installed to surround a previously installed conductor, i.e. one already inserted through a mounting wall and fixed at either end.

It is a further object of the present invention to provide a novel and improved conductor support of the above-described type which has a minimum number of inexpensive parts, which is easily installed in an electrical device and which has sufficient mechanical strength to withstand the bending and shifting forces of relatively massive and inflexible electrical conductors contained within the support.

These and other objects are accomplished by this invention, in one form thereof, by providing first and second channel members which are sequentially inserted in a mounting wall defining a passage through which one or more high voltage electrical conductors pass. A first channel member is generally U-shaped in cross section, being formed from a single sheet of pressboard (fuller board), kraft board, plastic or the like formable dielectric material. The first channel member includes two outer walls integrally formed with a coextensive intermediate wall. The two outer walls are deflectable toward each other, allowing the first channel member to take on a collapsed configuration of reduced cross sectional area. While collapsed, the first channel member is inserted through a passage in a mounting wall, and can, during such insertion, surround one or more conductors already positioned to extend the length of the passage. The two outer walls each include a free edge having engaging means, or notches, for receiving portions of the mounting wall when the first channel member is expanded to resume its U-shaped configuration. Upon reception of the mounting wall in the aforementioned notches, the first channel member is securely engaged with the mounting wall.

A second channel member, substantially identical to the first channel member, is dimensioned slightly smaller, so as to be telescopically inserted with an expanded first channel member. When so inserted, the second channel member forms an interference fit with the first channel member and also with portions of the mounting wall, so as to provide a secure engagement between the first and second channel members of the conductor support and the mounting wall. The first channel is thereby maintained in an expanded configuration, while the notches of the first channel member are maintained in engagement with the mounting wall. Conductors contained within the conductor support are thereby completely surrounded by a dielectric barrier which extends along the entire passage of the mounting wall.

In another embodiment of the invention, also comprised of first and second channel members, the first channel member is generally triangular shaped in cross-section, and the second channel member is generally V-shaped in cross section. Both channel members are formed by folding a single sheet of pressboard or the like to take on the aforementioned cross sectional configurations. Engaging means, or notches formed in outside corners of the first channel member are located for engagement with a mounting wall through which the first channel member is passed. Upon rotation of the first channel member about its axis, the notches are brought into engagement with the mounting wall. The second channel member is then telescopically inserted in the first channel member, forming an interference fit therewith to maintain the first channel member, and hence the completed conductor support, in engagement with the mounting wall.

In another embodiment comprised of first and second channel members, the first channel member, generally U-shaped in cross section has, in place of the aforementioned notch engaging means, a continuous, transversely extending groove formed in its outer surface. When the first channel member is inserted through an aperture of a mounting wall, the groove receives portions of the mounting wall located adjacent the aperture. The second, generally U-shaped, channel member is then telescopically inserted in the first channel member with an interference fit, thereby maintaining the grooved walls of the first channel member, and hence the completed conductor support, in engagement with the mounting wall.

In yet another embodiment, a generally cylindrical first channel member is inserted in an aperture of a mounting wall. A peripheral groove formed in the first channel member receives portions of the mounting wall adjacent the aperture. A second, generally cylindrical channel member is inserted in the first channel member, forming an interference fit therewith, while maintaining the engagement between the first channel member and the mounting wall.

These together with additional features, objects and advantages will become apparent from the following, wherein the details of construction and operation are more fully described and claimed. Reference is made to the accompanying drawings, forming a part hereof, wherein like numerals refer to like parts throughout.

BRIEF DESCRIPTION OF THE DRAWINGS

In the drawings:

FIGS. 7-9 show an alternative embodiment of a conductor support means according to the invention with FIG. 9 being a cross-sectional view taken in the direction of line 9—9 shown in FIG. 8;

FIG. 10 shows another alternative embodiment of a conductor support according to the invention; and FIG. 11 shows a further embodiment of a conductor support according to the invention.

DETAILED DESCRIPTION OF THE PREFERRED EMBODIMENT

Figure 1:
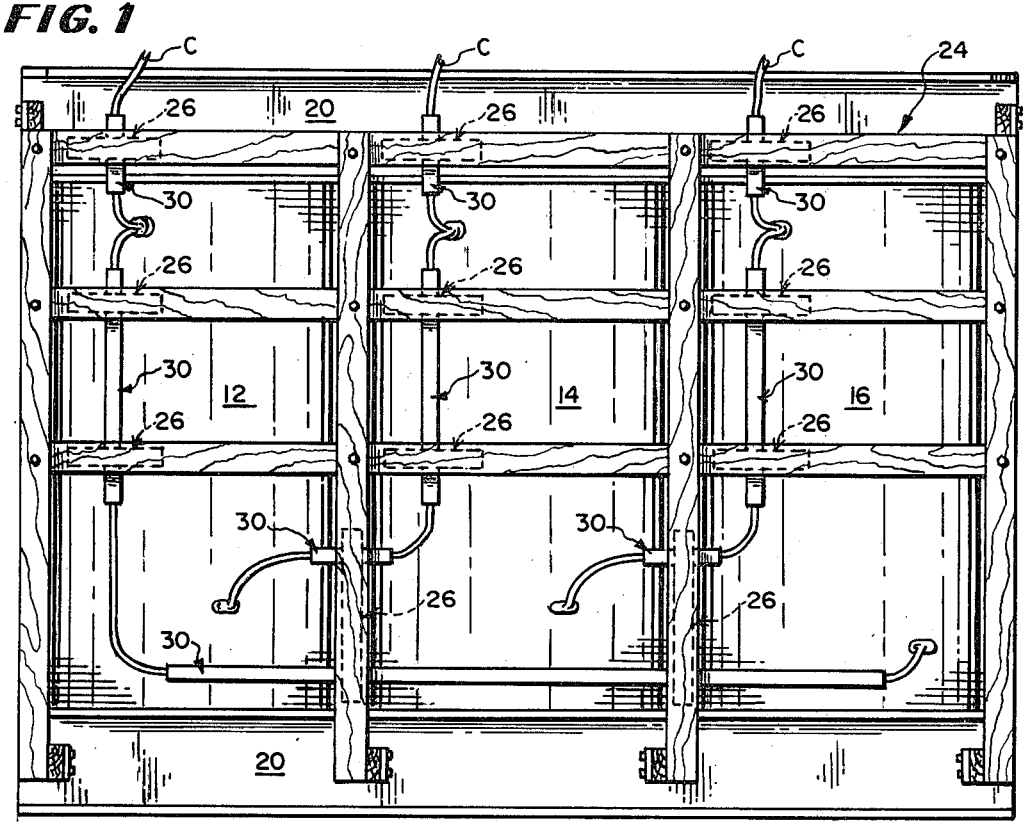
FIG. 1 is an elevation view of a magnetic core and coil assembly of a multiphase electrical transformer, having conductor support means in accordance with the invention.
Figure 2:
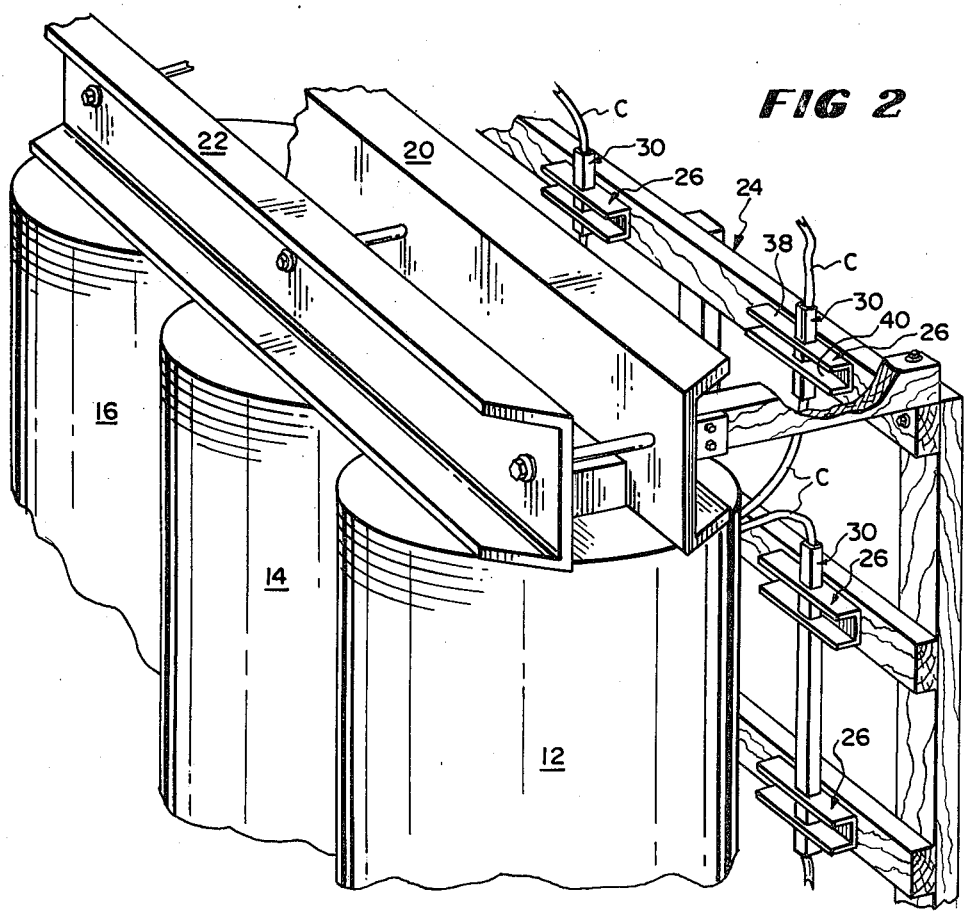
FIG. 2 is an enlarged fragmentary perspective view of FIG. 1. taken from behind the left hand side of the transformer assembly of FIG. 1.

Referring now to the drawings, and in particular to FIGS. 1 and 2, a multiphase transformer assembly is shown having three coil and magnetic core assemblies 12, 14, and 16. Metal support beams 20, 22 are attached at each end of the coils' magnetic cores. High voltage conductors C, which electrically interconnect the coils, are relatively massive, and require a framework for their physical support. The framework shown in FIG. 1 comprises a lattice 24 of wood or other insulating members, to which mounting channels 26 are secured by conventional screw-type fasteners. Mounting channels 26 are of conventional construction, comprising U-shaped members formed from pressboard (fuller board), kraftboard, plastic or the like formable dielectric materials. The wood members comprising the lattice 24 as shown in FIG. 1 may be substituted with mounting channels 26, capable of self support, assembled in a manner similar to that shown in FIG. 1. Conduits, or insulating conductor supports 30 constructed according to the invention, inserted through passages or apertures in mounting channels 26, completely enclose conductors C, providing support therefor as well as enhancing the electrical insulation between those conductors and grounded portions of the transformer assembly.

Figure 3:
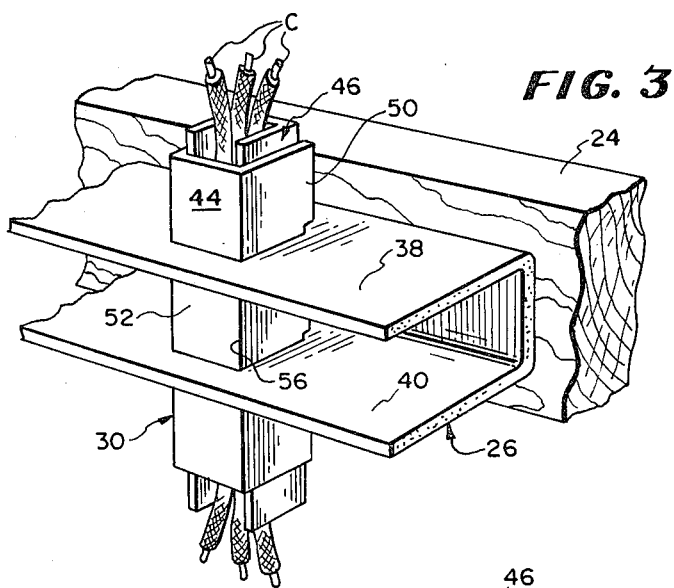
FIG. 3 is an enlarged view of the conductor support means of FIG. 2.
Figure 5:
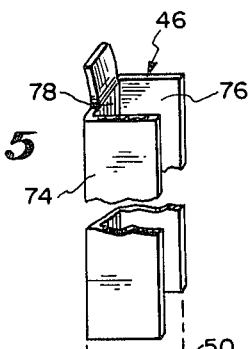
FIGS. 4-6 show a sequence of assembly of the conductor support means of FIGS. 1-3.
Figure 4:
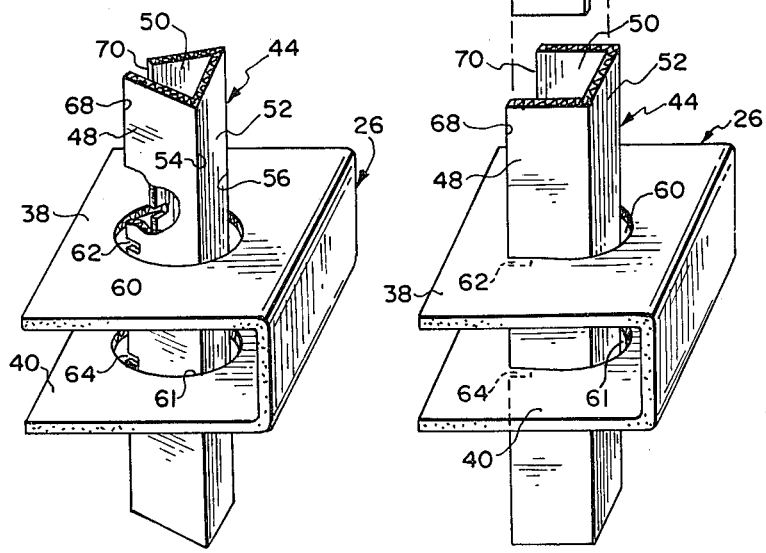
Figure 6:
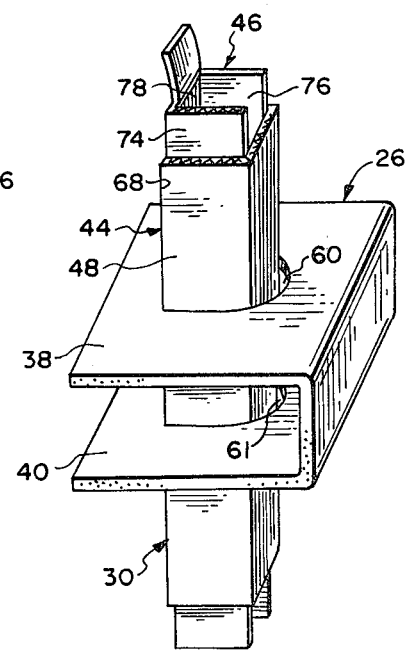

Referring now to FIG. 3, a completed conductor support 30 is shown installed in the spaced-apart wall 38, 40 of mounting channel 26. Support 30 comprises first and second folded channels 44, 46 respectively. Referring now to FIGS. 4-6, assembly of conductor support 30 will be described. The first folded channel 44 comprises outer walls 48, 50 and an intermediate wall 52. Channel 44 is preferably formed of a single piece of pressboard (fuller board), kraft board, plastic of the like formable dielectric material, which is folded along lines 54, 56 to form the aforementioned walls 48, 50, 52. By bending outer walls 48, 50 toward and away from each other, channel 44 can be collapsed to take on a contracted configuration, as shown in FIG. 4, or can be opened to take on an expanded configuration as shown in FIGS. 5 and 6 wherein mounting channel 26 is engaged in notches 62 and 64 formed in the free edges 68 and 70 of the two outer walls 48 and 50 forming the channel 44. Channel 44 is dimensioned to pass through a passageway formed by apertures 60, 61 located in mounting channel 26 when channel 44 is collapsed to take on a contracted configuration. With reference to FIG. 5, a second folded channel 46 comprises outer walls 74, 76 and intermediate wall 78. Channel 46 is substantially identical to channel 44, except channel 46 is of smaller dimensions so as to be telescopically insertable within expanded channel 44, when channel 44 is installed in mounting channel 26. When fully inserted in channel 44, as shown in FIGS. 3 and 6, channel 46 forms an interference fit with channel 44 and portions of mounting channel 26 adjacent apertures 60, 61 thereof. Further, intermediate wall 78 of channel 46 is interposed between outside walls 48, 50 of channel 44, thereby preventing channel 44 from assuming the collapsed configuration of FIG. 4, while maintaining the engagement of notches 62, 64 with mounting channel 26. It can be seen from the foregoing, that conductor support 30 can be completely assembled around a preinstalled conductor, i.e. one previously located in apertures 60 and 61 of mounting channel 26.

Referring now to FIGS. 7–9 another conductor support 90, constructed according to the invention, will be described. FIGS. 8, 9 show a completed conductor support 90 installed in a mounting channel 96 which is of identical construction to the mounting channel 26 of FIGS. 1–6, referred to above. Referring now to FIG. 7, a first folded channel 98 comprises outer walls 100, 102, and an intermediate wall 104. Channel 98 is preferably formed of a single piece of pressboard (fuller board), kraft board, plastic, or the like formable dielectric material, which is folded along lines 106, 108, to form the aforementioned walls 100, 102, and 104. Channel 98 is shown in FIG. 7 in a collapsed configuration, with the outer walls 100, 102 bent toward each other.

After channel 98 is telescopically inserted in apertures 114, 116 of mounting channel 96, the outer walls 100, 102 are moved away from each other, with channel 98 taking on an expanded configuration, as shown as FIGS. 8, 9. Continuous grooves 120, 126 formed on the outer surfaces of walls 100, 102, and 104 of channel 98 receive walls 122, 128, respectively, of mounting channel 96, when channel 98 is opened to take on an expanded configuration. The undercut portion of each groove forms shoulders which engage mounting walls 122, 128, to hold channel 98 in engagement with mounting channel 96.

A second folded channel 130, comprising outer walls 132, 134 and an intermediate wall 136, is telescopically inserted in expanded channel 98, passing through apertures 114, 116 of mounting channel 96. When fully inserted in channel 98, as shown in FIGS. 8, 9, channel 130 forms an interference fit with channel 98 and portions of mounting channel 96 adjacent apertures 114, 116. Further, intermediate wall 136 of channel 130 is interposed between outer walls 100, 102 of channel 98, thereby preventing channel 98 from assuming the collapsed configuration of FIG. 7, while maintaining the engagement of grooves 120, 126 with mounting channel 96.

Referring now to FIG. 10, a conductor support 150, constructed according to another embodiment of the invention, is shown. Conductor support 150 comprises an outer folded channel 152, and an inner folded channel 154. Inner and outer channels 152, 154 are formed of pressboard (fuller board), kraft board, plastic or the like dielectric material, and are preferably formed by folding a single sheet of such material. Outer channel 152 is generally triangular-shaped in cross section, and is dimensioned to pass through apertures 158, 160 of mounting channel 162. Notches 166, 168 are formed at a first corner or fold line 170 of channel 152. After insertion through apertures 158 and 160, the outer folded channel 152 is rotated about its longitudinal axis, thereby bringing notches 166, 168 into engagement with wall portions 174, 176 of mounting channel 162, After outer channel 152 is positioned, inner channel 154, generally V-shaped in cross section, is telescopically inserted within outer channel 152.

When so inserted, inner channel 154 forms an interference fit with outer folded channel 152, and portions of walls 174, 176 of mounting channel 162 which are received by notches 166, 168. A second pair of notches, not shown in FIG. 10, are formed along a folded corner adjacent corner 170 (ie. adjacent edge 177 of inner channel 154), and operate as set forth above with respect to notches 166, 168. Upon the insertion of inner channel 154, completed conductor support 150 becomes interlocked, or wedged in the walls 174, 176 of mounting channel 162, thereby providing a fixed insulating support for conductors inserted through support 150.

Referring now to FIG. 11, another conductor support 180, constructed according to the invention, is shown installed in the spaced apart mounting walls 184, 186 of channel 188. Conductor support 180 comprises outer and inner generally cylindrically shaped channel members 192, 194, respectively. Channel members 192, 194, are made of pressboard (fuller board), kraft board, plastic, or the like formable dielectric material. Outer channel 192 has a longitudinal opening or slot 196, which permits the outer channel 192 to be compressed or collapsed to allow insertion through a passage formed by unnumbered apertures located in walls 184, 186 of mounting channel 188. Grooves 200, 202 formed in the outer surface of outer channel 192 are dimensioned to receive walls 184, 186.

Outer channel 192, formed of pressboard (fuller board) or the like dielectric material, exhibits the requisite resiliency, or outward bias, to bring grooves 200,202 into engagement with walls 184, 186, respectively. Inner channel 194 is thereafter telescopically inserted in outer channel 192, forming an interference fit therewith to provide an interlock or wedged fit between conductor support 180 and walls 184 and 186 of mounting channel 188.

The various conductor supports set forth above provide the strength and rigidity necessary to contain the relatively massive conductors inserted therethrough, and to successfully withstand a shifting of those conductors during shipment and subsequent operation of the electrical device within which they are installed. Further, the conductor support according to the invention provides an insulation barrier of increased dielectric strength, between those conductors and adjacent framework members. The conductor supports constructed according to the invention do not require adhesives, clamping arrangements, or the like securing means which, when brought in close proximity to high voltage conductors, decrease the dielectric strength of the insulation which extends between those conductors and adjacent portions of the electrical device which are operated at a lower electrical potential.

Further, it can be seen that each of the aforementioned conductor supports according to the invention can be constructed to surround previously installed conductors, without requiring that the conductors be severed or otherwise disconnected.

While several embodiments of this invention have been illustrated and described, it will be recognized that the invention may be otherwise variously embodied in practice, within the scope of the following claims.

I claim:

1. In an electrical device having a high voltage conductor and at least one mounting wall having a passage therethrough through which the high voltage conductor passes, a conductor support comprising:
a first channel member, formed from a sheet of dielectric material, inserted in said passage and at least partially surrounding said conductor; engaging means, formed in said first channel member intermediate the ends thereof engaging the edges of said mounting wall adjacent said passage along the periphery of said passage; and
a second channel member, formed from a sheet of dielectric material, inserted in said first channel member and at least partially surrounding said conductor,
said first and said second channel members cooperating to completely surround the conductor, said second channel member having a first portion interposed between said conductor and the edges of said mounting wall defining said passage and a second portion interposed between said conductor and said first channel member,
said second channel member being maintained in engagement with said first channel member by an interference fit, whereby said conductor is supported by said mounting wall.

2. The combination of claim 1, wherein said first channel member is elongated and defines two free edges paralleling the longitudinal axis of said first channel member, said engaging means including notches formed in said free edges, said notches receiving the edges of said mounting wall adjacent said passage.

3. The combination of claim 1, wherein said second channel member engages said first channel member and portions of said mounting wall adjacent said passage with an interference fit.

4. The combination of claim 1, wherein said engaging means comprises an undercut portion of said first channel member having a shoulder engaging portions of the edges of said mounting wall adjacent said passage.

5. The combination of claim 4, wherein said first channel member has an outer surface, said undercut portion including a continuous groove formed in the outer surface of said first channel member, said groove receiving selected portions of the edges of said mounting wall adjacent said passage.

6. The combination of claim 5, wherein said first and said second channel members are substantially cylindrical.

7. The combination of claim 1, wherein said first channel member is telescopically inserted in said passage of said mounting wall, and said second channel member is telescopically inserted in said first channel member with an interference fit so as to maintain said engaging means in engagement with said edges of said mounting wall adjacent said passage.

8. The combination of claim 1, wherein said first channel member has a generally U-shaped cross section formed by at least three integrally formed walls, two of said walls each having a free edge, said engaging means comprising notches formed in said free edges, said notches receiving portions of the edges said mounting wall adjacent said passage.

9. The combination of claim 8, wherein said second channel member has a generally U-shaped cross section formed by at least three integrally formed walls.

10. The combination of claim 1, wherein said first channel member has a generally triangular-shaped transverse cross section formed by at least three integrally connected generally flat walls with the interfaces between adjacent integrally connected walls forming elongated edges, said engaging means including a notch formed in at least one of said elongated edges, said notch receiving selected portions of the edges of said mounting wall adjacent said passage.

11. In a high voltage electrical device having at least one high voltage electrical lead defining a first cross sectional dimension and having a structural component with a plurality of spaced-apart generally rigid wall members, each of the rigid wall members having an aperture therethrough, an insulating support structure, comprising:
a first support sheet of dielectric material inserted into said apertures to partially surround said electrical lead, said first support sheet being of unitary construction and having a plurality of spaced apart bendable wall portions, two of said wall portions each having a free edge with a plurality of spaced-apart notches adapted to receive those portions of the rigid wall members adjacent the apertures defined by the rigid wall members, said first support sheet having a first expanded configuration whose cross-sectional dimension is generally equal to the cross-sectional dimension of each aperture, said bendable wall portions being bent together and inserted into each aperture about said electrical lead to form a second collapsed configuration whose cross-sectional dimension is generally less than the cross-sectional dimension of each aperture; and
a second support sheet of dielectric material inserted in said first support sheet and about the electrical lead to form an interference fit with said first support sheet, said second support sheet being of unitary construction and having a cross-sectional dimension substantially equal to the cross-sectional dimension of said first support sheet in its first expanded configuration, said second support sheet underlying the free edges of said first support sheet and cooperating with said first support sheet to completely surround said electrical lead,
said first support sheet being held in its first expanded configuration within each aperture by said second support sheet, the electrical lead being supported by and insulated from said structural component by said first and second support sheets, and said apertures being not completely plugged by said electrical lead and said first and second support sheets.

12. In an electrical device having a high voltage conductor and a plurality of spaced-apart mounting walls having a passage therethrough through which said high voltage conductor passes, a conductor support comprising:
a first dielectric support member, inserted into said passage, of unitary construction and having a plurality of wall portions of uniform cross section, said wall portions being deflectable toward each other to permit insertion of said first support member in said passage about said conductor,
said wall portions of said first support member including engaging means for engaging at least two of said spaced-apart mounting walls of said electrical device when said wall portions of said first support member are deflected away from each other; and a second dielectric support member, inserted between said first support member and said conductor, of unitary construction and having a plurality of wall portions of uniform cross section, said second support member forming an interference fit with said first support member so as to keep said wall portions of said first support member spread apart and to maintain said engaging means in engagement with said spaced-apart mounting walls, said first and said second support members cooperating to form a conduit completely insulating said electrical conductor within said passage without completely filling the annular space between said conductor and said mounting walls.

13. The combination of claim 12, wherein said first support member has a generally U-shaped cross section formed by three integrally connected wall portions with two of said wall portions each defining a free edge, said engaging means comprising notches formed in each free edge and sized to receive those portions of said spaced-apart mounting walls adjacent said passage.

14. The combination of claim 12, wherein said first support member defines an outer wall surface, said engaging means comprising undercut portions with shoulder means engaging portions of said mounting walls adjacent said passage.

15. The combination of claim 12, wherein said first support member is substantially an elongated cylinder having a slit extending the length thereof, with portions adjacent the slit deflectable toward each other, said engaging means comprising undercut portions with shoulder means engaging portions of said mounting walls adjacent said passage.

* * * * *